US010008128B1

(12) United States Patent
Al Darwesh et al.

(10) Patent No.: US 10,008,128 B1
(45) Date of Patent: Jun. 26, 2018

(54) SYSTEMS AND METHODOLOGIES FOR ASSISTING COMMUNICATIONS

(71) Applicant: Imam Abdulrahman Bin Faisal University, Dammam (SA)

(72) Inventors: Sukina Jafar Al Darwesh, Qatif (SA); Zahra Ali Al Hashim, Qatif (SA); Masoumah Ali Al Mughyis, Qatif (SA); Huda Salman Almuallim, Qatif (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 0 days. days.

(21) Appl. No.: 15/367,354

(22) Filed: Dec. 2, 2016

(51) Int. Cl.
*G08B 29/16* (2006.01)
*G09B 21/00* (2006.01)

(52) U.S. Cl.
CPC .................. *G09B 21/009* (2013.01)

(58) Field of Classification Search
CPC .............................. G05B 5/065; G09B 21/001
USPC ........................................................ 340/4.13
See application file for complete search history.

(56) References Cited

U.S. PATENT DOCUMENTS

| | | | |
|---|---|---|---|
| 6,233,319 B1 * | 5/2001 | Cox | H04M 1/274575 379/406.01 |
| 6,377,925 B1 | 4/2002 | Greene, Jr. et al. | |
| RE41,002 E | 11/2009 | Liebermann | |
| 8,326,635 B2 * | 12/2012 | Usher | H04R 1/10 704/258 |
| 9,111,545 B2 | 8/2015 | Jadhav et al. | |
| 9,691,258 B2 * | 6/2017 | Sloo | G08B 29/185 |
| 2005/0055223 A1 * | 3/2005 | Khosla | G06Q 10/06 705/7.42 |
| 2009/0029716 A1 * | 1/2009 | Thomas | G01N 33/0075 455/456.1 |

(Continued)

FOREIGN PATENT DOCUMENTS

CN        1095580 C        12/2002

OTHER PUBLICATIONS

T. Arsan, et al., "Sign Language Converter" International Journal of Computer Science & Engineering Survey (IJCSES), vol. 6, No. 4, Aug. 2015, pp. 39-51.

(Continued)

*Primary Examiner* — Vernal Brown
(74) *Attorney, Agent, or Firm* — Oblon, McClelland, Maier & Neustadt, L.L.P.

(57) ABSTRACT

A method and system for assisting communication. The method includes receiving a message in a first communication medium from a first device of a first user. The message has one or more recipients. The method further includes determining whether at least one recipient of the one or more recipients is in a predefined category by referencing a stored look-up table, monitoring, via one or more sensors, surroundings of the at least one recipient when the at least one recipient is in the predefined category, detecting whether there is a hazard based on the monitoring, and determining whether the first communication medium corresponds to a preferable communication medium based on the predefined category of the at least one recipient. Further, the method includes converting the message to the preferable communication medium and delivering the converted message to at least one recipient device when a hazard is not detected.

20 Claims, 11 Drawing Sheets

(56) References Cited

U.S. PATENT DOCUMENTS

| | | |
|---|---|---|
| 2011/0116608 A1 | 5/2011 | Simmons |
| 2013/0204605 A1 | 8/2013 | Illgner-Fehns |
| 2014/0171036 A1 | 6/2014 | Simmons |
| 2014/0229568 A1* | 8/2014 | Raffa .................... H04L 67/12 709/217 |
| 2015/0341290 A1* | 11/2015 | Cherifi ................. H04L 51/043 709/206 |

OTHER PUBLICATIONS

E. Zoifagharifard. "Now everyone can understand Sign Language: Microsoft Kinect sensor converts hand signals into speech and text" http://www.dailymail.co.uk/sciencetech/article-2481515/Microsoft-Kinect-sensor-converts-sign-language-speech-text.html. http://research.microsoft.com/en-us/collaboration/stories/kinectforsignlanguage_cs.pdf, Oct. 31. 2013, pp. 1-27.
Mimix, "Mimix Sign Language Translator" https://play.google.com/store/apps/details?id=me.mimix.roid&hl=en, Screenshot printed date Apr. 22, 2016, pp. 1

\* cited by examiner

| Location | Hazards for visual difficulties | Hazards for hearing difficulties |
|---|---|---|
| Rural location | Getting on and off carts, boats | Hazardous noise levels, emergency vehicles |
| Urban location | Vehicles, street crossing, construction on sidewalk, overhead obstacles | Hazardous noise levels, vehicles, emergency vehicles |
| Indoor location | Furniture, doors left ajar, clutter | Fire alarm warnings |

*FIG. 2*

SYSTEMS AND METHODOLOGIES FOR ASSISTING COMMUNICATIONS

BACKGROUND

One of the challenges facing a person with physical limitation such as auditory, speech, or visual difficulties is to communicate with individuals having disabilities and with other normal individuals. This gap in communication is generally solved by use of sign language. Sign language is the name given to visually perceivable gestures, which are primarily formed using the hands in connection with facial expression, mouth expression, and posture. Sign language may be restricted to trained individuals who can decipher the presentation.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention.

SUMMARY

The present disclosure relates to a method that receives a message in a first communication medium from a first device of a first user. The message has one or more recipients. The method determines, using processing circuitry, whether at least one recipient of the one or more recipients is in a predefined category by referencing a stored look-up table; monitors, via one or more sensors that are conveyed by at least one recipient device, surroundings of the at least one recipient when the at least one recipient is in the predefined category; detects whether there is a hazard based on the monitoring by analyzing data provided by the one or more sensors; and determines whether the first communication medium corresponds to a preferable communication medium based on the predefined category of the at least one recipient. Further, the method converts the message to the preferable communication medium when the first communication medium does not correspond to the preferable communication medium; and delivers the converted message to the at least one recipient device when a hazard is not detected.

The foregoing paragraph has been provided by way of general introduction, and is not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 2 is a table that shows exemplary hazards at a plurality of locations according to one example;

DETAILED DESCRIPTION

Figure 1:
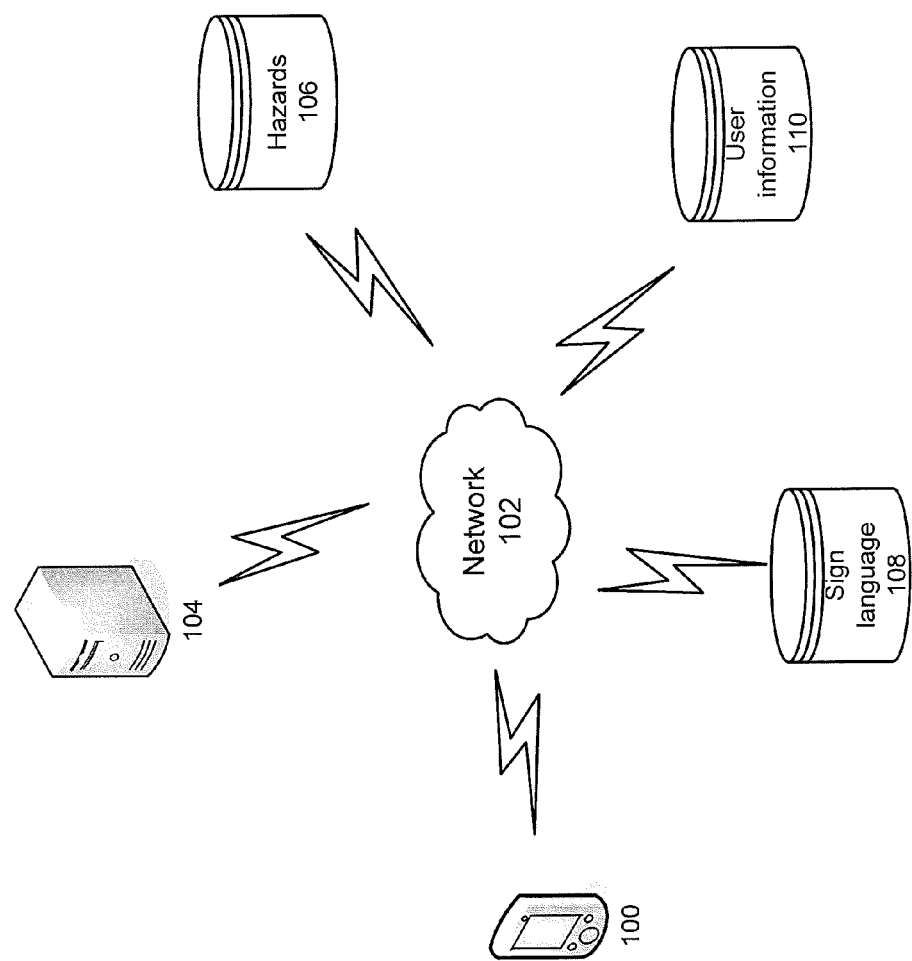
FIG. 1 is a schematic diagram of a system for assisting communications according to one example.

Referring now to the drawings, wherein like reference numerals designate identical or corresponding parts throughout several views, the following description relates to a system, a communication device, and associated methodology for communications between a plurality of users, including users having any degree of visual, hearing, or speech difficulties.

Specially, as shown in the drawing and related discussion, the communication device can be used by any user regardless of having visual, hearing, or speech difficulties. Thus, users may communicate seamlessly with each other. For example, a first user may hear aloud from the communication device what a second user with speaking disabilities is signing into a camera of the communication device associated with the second user. In addition, a third user may receive a text version of what the second user is signing. One of the advantages of the present disclosure is that group communication may be available regardless of whether a user has any degree of visual, hearing, or speech hearing difficulties. In addition, the system can alert the user to any hazards that may endanger the user while using the communication device.

FIG. 1 is a schematic diagram of a system for assisting communications according to one example. The system may include a communication device 100, a network 102, a server 104, a hazards database 106, a sign language database 108, and a user information database 110.

The communication device 100 may include a mobile phone, a personal digital assistant, a palmtop, a mobile digital assistant, a digital wrist watch, or the like. Two or more communication devices 100 are configured to communicate with each other via network 102.

The network 102 is any network that allows the server 104 and the communication device 100 to communicate information with each other. Suitable networks can include or interface with any one or more of a local intranet, a PAN (Personal Area Network), a LAN (Local Area Network), a WAN (Wide Area Network), a MAN (Metropolitan Area Network), a VPN (Virtual Private Network), or a SAN (storage area network). Furthermore, communications may also include links to any of a variety of wireless networks, including WAP (Wireless Application Protocol), GPRS (General Packet Radio Service), GSM (Global system for Mobile Communication), CDMA (Code Division Multiple Access) or TDMA (Time Division Multiple Access), cellular phone networks, GPS (Global Positioning System), CDPD (Cellular digit packet data), Bluetooth radio, or an IEEE 802.11 based radio frequency.

Figure 11:
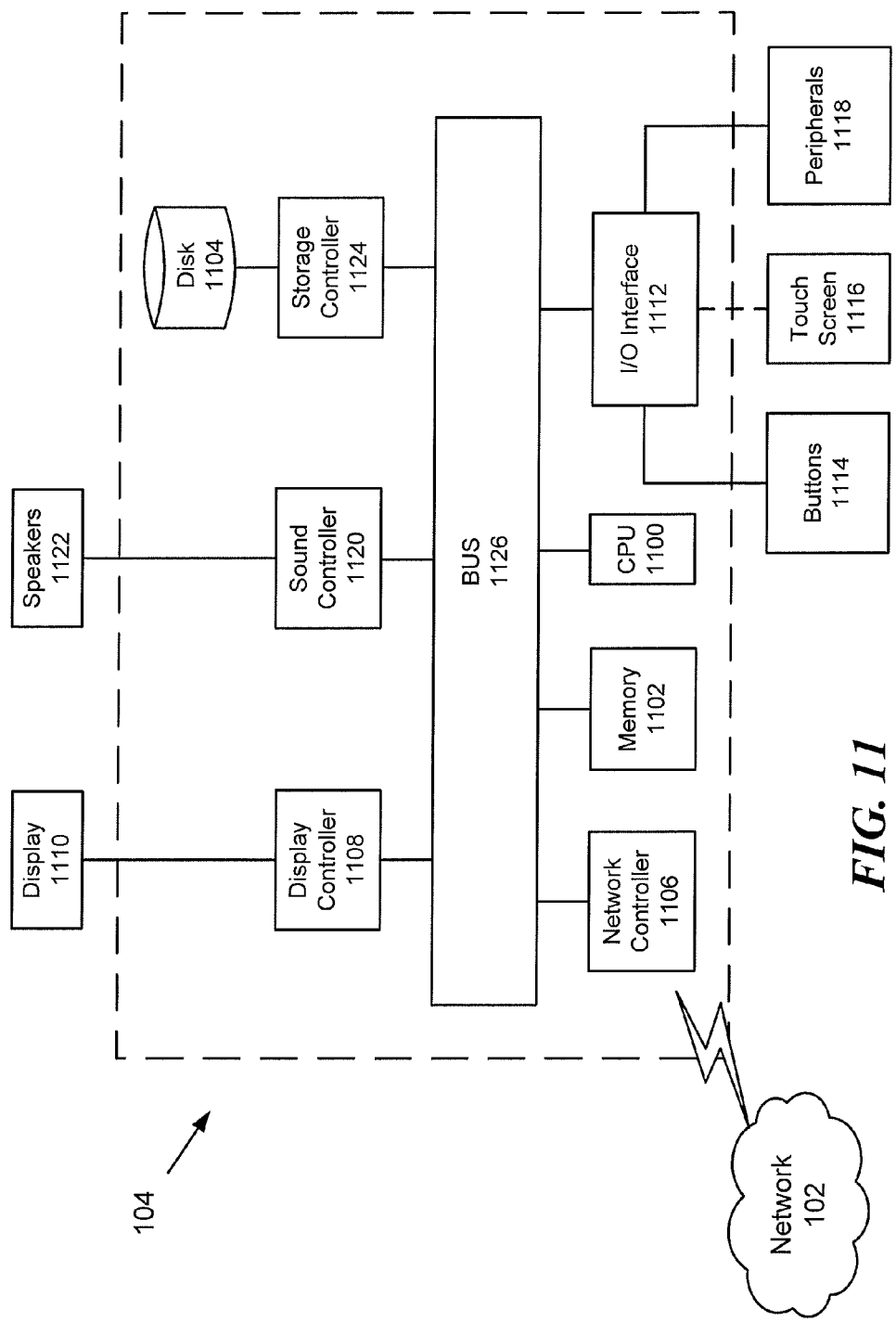
FIG. 11 is an exemplary block diagram of a server according to one example.

The server 104 can include one or more servers 104 and is connected to the communication device 100, the hazards database 106, the sign language database 108, and the user information database 110 via the network 102. The server 104 includes a CPU 1100 and a memory 1102 as shown in FIG. 11.

The server 104 may receive a message in a first communication medium (e.g., text, speech, sign language sequence) from a first communication device that has received a message input from a first user. The communication may be one-to-one communication (i.e., having one recipient) or a group communication (e.g., group chatting, conference call) having two or more recipients. The server 104 may convert the message to one or more communication mediums based on an identity of the one or more recipients that is determined based on identify information for each recipient stored in the user information database 110. Then, the server 104 delivers the message to the one or more recipients. In addition, the server 104 may store the message and the message in the transformed communication media for a predetermined period of time. Each recipient may connect to the server 104 from the communication device 100 to download the message at a later time.

The hazards database 106 can store preselected objects (e.g., images) and sounds (e.g., noises) associated with hazards. The hazards may be classified based on the type and degree of visual, hearing, or speech difficulties. For example, a sound of a speeding vehicle may be associated with hearing difficulties. A street crossing may be associated with visual difficulties.

The hazards may be classified according to location (e.g., rural location, urban location, indoor location). In addition, each of the hazards can have a threshold value that is associated with a particular location. For example, rural locations can have sound thresholds that are lower than urban locations. For example, the threshold value in decibel sound levels from vehicle horns may be higher in urban locations than the decibel sound level in rural locations. Thus, a detected noise may be classified as a hazard when in a rural location but not when the user is in an urban location. Indoor locations can have lower sound thresholds than outdoor locations. The server 104 can determine whether or not the communication device is inside or outside based on position information as well as whether or not the device is connected to WI-FI or another communication network that may indicate that the communication device is most likely indoors (e.g., connected to "home" WI-FI network, or a "restaurant" WI-FI network).

Further, the server 104 may store visual thresholds associated with a particular location. For example, a visual threshold may include an amount of detected motion in captured video that may be lower for rural locations than for urban locations. That is, a small scene change between consecutive frames in a captured video may indicate a hazard in a rural location whereas a more drastic scene change indicates a hazard in an urban location.

In one aspect, the server 104 may generate an alert to a user with speech difficulties when the amount of brightness is below a predetermined threshold value that indicates that the user may not be able to communicate via sign language due to the communication device 100 being unable to capture via the camera the user signing in low light conditions. The predetermined threshold value may be manually saved in the hazards database 106. Additionally or alternatively, the server 104 can determine the threshold values by monitoring location that the user frequents and applying learning algorithms to determine the baseline values for the threshold values. For example, when the user is continuously moving the communication device 100 trying to capture a sign language input, the communication device 100 may detect the amount of brightness in the user surroundings. Then, the communication device 100 may transmit the value to the server 104 as unsuitable for communication via sign language. The server 104 determines the predetermined threshold values based on values received from one or more communication devices. For example, the server 104 can associate received sensor values from the communication device 100 with a location of the communication device 100 when the sensor values are received and can determine the predetermined threshold values based on learned trends in the received sensor values.

The sign language database 108 can store video sequences associated with text data of words and/or terms. The sign language may correspond to a plurality of sign language families such as American sign language (ASL), Arab sign language, British sign language, and the like.

The user information database 110 can store information associated with users such as preferred communication mode, authentication information, and the presence of any visual, hearing, or speech difficulty. The information may also include the identity of each user. In response to receiving a communication for a user, the server 104 may access the user information database 110 to retrieve the identity of the user. For example, once the server 104 a text message for user A, the server 104 accesses the user information database 110 to retrieve information associated with user A such as any difficulties and the preferred communication mode associated with user A.

Further, the user information database 110 can store a location profile for each user. The location profile may include locations that the user frequents. The server 104 may determine the locations based on location monitoring.

The geographic location of the user may be determined by a plurality of methods. For example, the geographic location may be stored in the user information database 110. The geographic location may also correspond with the communication device 100. That is, once the communication device's location is determined by any of the techniques described herein or other methods as known in the art, the user's location is also likely established. The communication device's location can be determined via various satellite-based positioning systems known in the art, such as GPS (Global Positioning System). For example, the communication device 100 may include a location detector. The location detector may be a GPS module for detecting a current geographical location of the communication device. In one embodiment, the communication device's location is determined via a cellular tower with which communication has been established using current technology such as GMS (Global System for Mobile) localization, triangulation, Bluetooth, hotspots, WiFi detection, or other methods as would be understood by one of ordinary skill in the art. The communication device's location can be determined by the network 102. In particular, the CPU 1100 may detect a location of the communication device as a network address on the network 102.

The description herein is provided with reference to the system being located and implemented external to the communication device 100. However, it is to be understood that the system may alternatively or additionally be implemented within the communication device 100, and the databases of the system may correspond to a memory of the communication device 100. Further, in some embodiments, the system may be implemented as an application that may be downloaded on the communication device 100.

FIG. 2 is a table 200 that shows exemplary hazards at a plurality of locations according to one example. Table 200 shows exemplary hazards based on the location of the user. The preselected objects/sounds associated with the exemplary hazards are stored in the hazards database 106. For example, for an individual with visual difficulties and currently in an urban location, the server 104 may compare detected objects with the preselected objects associated an urban location such as vehicles, street crossing, construction on sidewalks, and overhead obstacles. Further, table 200 may store the visual and hearing thresholds for each of the hazard and location association.

Figure 3:
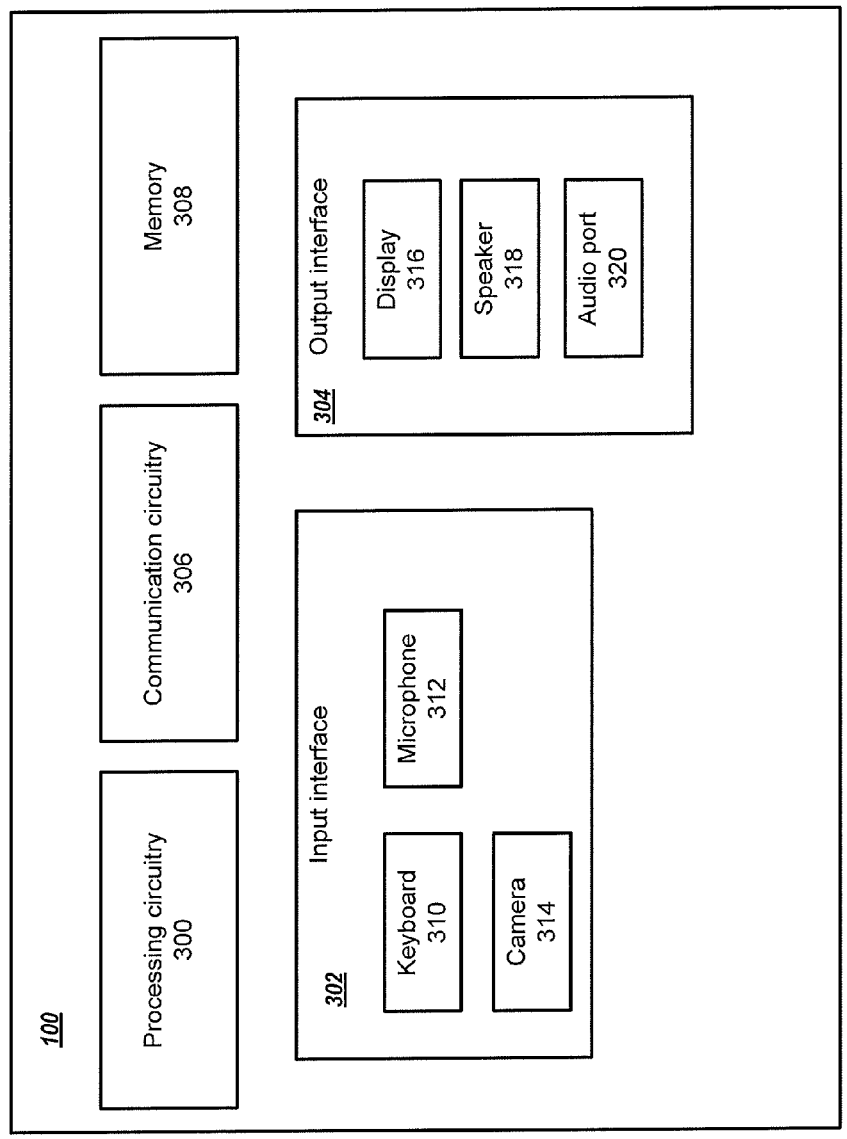
FIG. 3 is a block diagram of a communication device according to one example.

FIG. 3 is a block diagram of a communication device 100 according to one example. The communication device 100 may include processing circuitry 300, an input interface 302, an output interface 304, communication circuitry 306, and a memory 308.

The input interface 302 may include a keyboard 310, a microphone 312, and one or more cameras 314. The keyboard 310 may be a Braille keyboard. The input interface 302 may be built in or attached to the communication device 100. A user input may be in the form of speech, text, hand written text, facial expressions, sign language, Braille codes, or graphics.

The one or more cameras 314 may be strategically positioned to capture a 360 degree view of the user's surroundings. For example, a first camera may be positioned on the front of the communication device 100 and a second camera may be positioned on the rear of the communication device 100. The one or more cameras 314 may be rotated by the processing circuitry 300 to capture a desired field of view. For example, the desired field of view may correspond to scenery in the direction of movement of the user. The direction of movement of the user may be determined using accelerometers included in the communication device 100.

The output interface 304 may include a display 316, a speaker 318, and an audio port 320. In some implementations, the audio port 320 can be any type of interface port (e.g., USB, HDMI, etc.) that allows the communication device 100 to connect to another device, such as an external screen, speakers, etc. The output interface 304 may be built-in or attached to the communication device 100. The display 316 may be overlaid with a multi-touch input surface (MTIS). The MTIS may be implemented using capacitive technologies, resistive technologies, optical technologies, wave technologies, or other technologies as would be understood by one of ordinary skill in the art.

The processing circuitry 300 may perform one or more of the processes, in conjunction or separately, described below. The process data and instructions may be stored in the memory 308. The process data and instructions may also be stored remotely, for example, in the server 104.

The communication device 100 may be used by a plurality of users. The communication device 100 may identify a particular user. The processing circuitry 300 may then automatically configure the settings (e.g., preferable message delivery mode) based on the identified user. For example, users (e.g., siblings, friends, family) may be sharing the same communication device 100. Thus, the user may be authenticated before starting or receiving a communication. The authentication can be performed by a variety of methods such as voice recognition via the microphone 312 or fingerprint recognition via a fingerprint sensor. The fingerprint is verified using fingerprint verification circuitry by comparing the fingerprint with fingerprints stored in the memory 308 of the communication device 100. The user may also be identified by inputting a user name and password using a GUI (Graphical User Interface) such as GUI 902 shown in FIG. 9.

Figure 4:
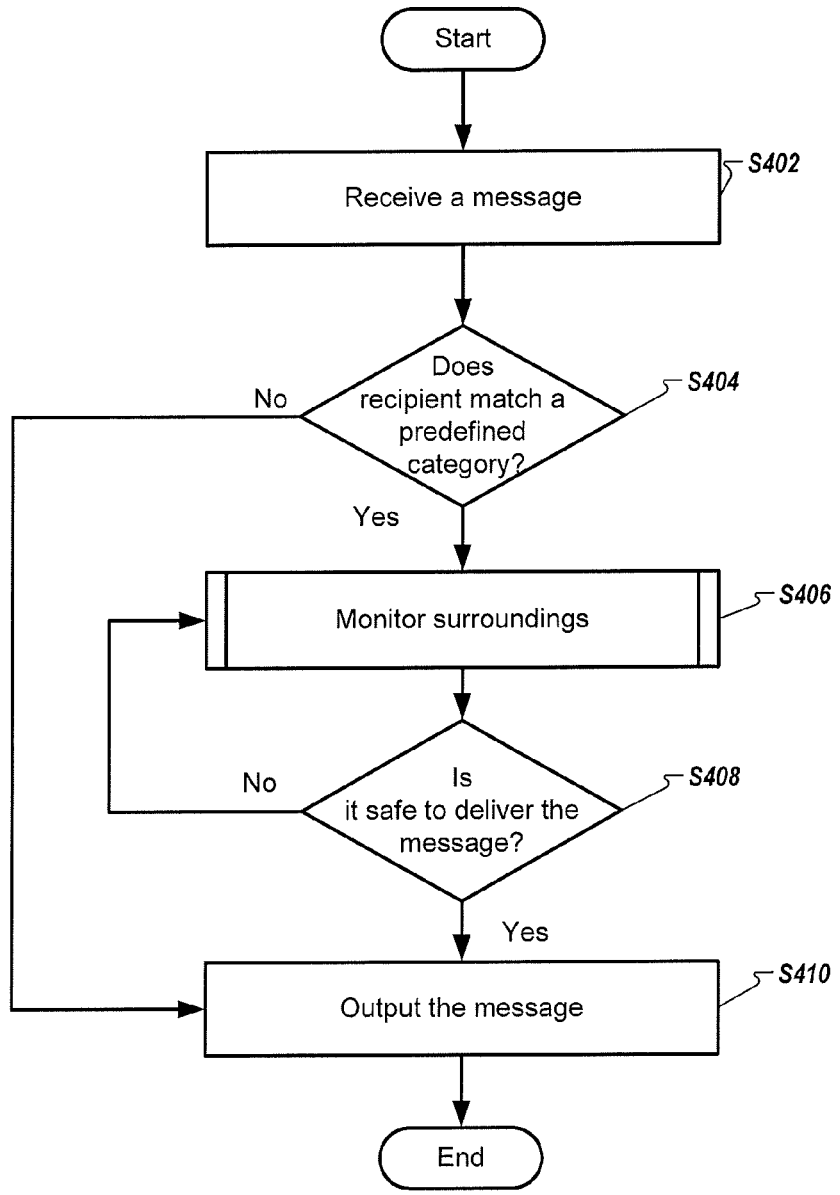
FIG. 4 is a flowchart that shows a method for assisting communications according to one example.

FIG. 4 is a flowchart for assisting communications according to one example. At step S402, the server 104 may receive a message (e.g., voice, text, video, sign language sequence) from an external device of a first user to one or more recipients. The message may be a complete or a partial message. For example, in a voice conversation, segments of the voice conversation may be received by the server 104.

At step S404, the server 104 may determine whether at least a recipient from the one or more recipients belongs to a predefined category. The server 104 may access the user information database 110 to retrieve information associated with the one or more recipients. Then, the server 104 analyzes the information to determine whether the information indicates that at least a recipient has hearing difficulties, visual difficulties, or speech difficulties. The predefined categories include individuals with hearing difficulties, visual difficulties, and speech difficulties. The predefined categories may also include individuals that have requested surrounding monitoring before communication message delivery as a personal safety precaution. In response to determining that the recipient belongs to a predefined category, the process proceeds to step S406. In response to determining that the recipient does not belong to a predefined category, the process moves to step S410.

At step S406, the server 104 may monitor the surroundings of the recipient. For example, the monitoring may be using the method shown in FIG. 6. The server 104 may receive a signal from communication device 100 of the recipient. The signal may include a real-time recording of ambient noise. In addition, the signal may include a video feedback of the surroundings captured by the one or more cameras 314 included in the communication device 100.

At step S408, the server 104 may determine whether the message may be delivered safely based on the monitoring of the surroundings. For example, the server 104 may check to see whether any hazard is present in the surroundings as described later herein. The server 104 may determine that the message may be delivered safely when the monitoring of the surroundings indicates that there is no change in the surroundings (e.g., no hazard is approaching the user). For example, the server 104 may compare successive scenes captured by the one or more cameras 314 to determine whether there is a change in the surroundings. In one example, the server 104 may determine that the message may be delivered safely when the monitoring indicates that the user is indoors. In response to determining that the message may be delivered safely, the process moves to step S410. In response to determining that the message may not be delivered safely, the process goes back to step S406. In one aspect, the server 104 may determine a severity level that indicates how unsafe it is to deliver the message (e.g., imminent dangers such as a vehicle moving towards the user at a high speed). In response to determining that the severity level is above a predetermined threshold, the server 104 may send a signal to the communication device 100 causing the communication device to turn off or the communication application. This provides the advantage of restricting the user from trying to send or receive a communication message when the severity level is high. Further, the server 104 may determine a confidence level of how unsafe is delivered the message. The confidence level may be determined based on a match between a detected object and a preselected object via image recognition techniques. In addition, the server 104 may generate and send a notification to the external device of the sender indicating that the message delivery is delayed. In certain aspects, the server 104 may send the notification when the message is not delivered within a predetermined period (e.g., five minutes, ten minutes).

Figure 7:
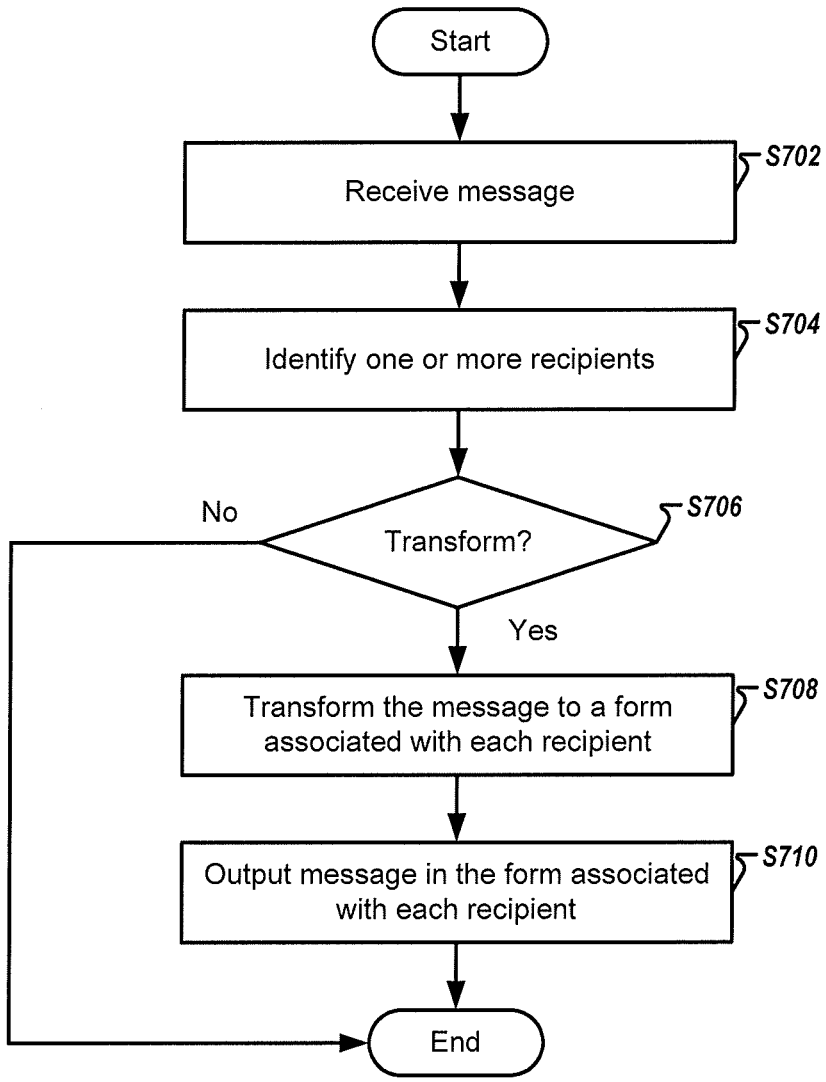
FIG. 7 is a flowchart that shows a method for transforming a message according to one example.

At step 410, the server 104 delivers the message to external devices of the one or more recipients based on the communication medium and/or language associated with each of the recipients. For example, the server 104 may transform the message from a first communication medium to a second communication medium based on the predefined category of the recipient. For example, the server 104 may transform the message from an audio input to a sign language sequence when the recipient has hearing difficulties. FIG. 7 shows an exemplary method for message transformation.

In one aspect, the communication device 100 may delay the outputting of the message received from the server 104 based on the message contents and the communication medium of the message. The communication device 100, using the processing circuitry 300, may analyze the contents of the message in real time to determine whether any of the contents of the message is private. For example, the processing circuitry 300 may determine that the message is private based on predetermined keywords (e.g., passwords, medical test results). The predetermined keywords may be stored in a database. Additionally or alternatively, the predetermined keywords may be associated with each user. For example, each user may select the predetermined keywords via the communication device 100. Then, the predetermined keywords are transmitted to the server 104 and stored in the user information database 110. When the processing circuitry 300 detects a private message, an audio message is not output automatically. In one aspect, the sender may indicate that the message is private. In addition, the processing circuitry 300 may automatically determine that the message is private based on the sender's identity. For example, messages from friends and family may be automatically classified as private when sent to a work communication device. Further, when a message is flagged as private (e.g., by the sender or the receiver), the processing circuitry 300 may analyze the contents of the message to extract additional predetermined keywords. The processing circuitry 300 may check whether earphones are plugged into the communication device 100 via the audio port 320 before delivering an audio message that includes private contents. As a result, the user may not need to perform additional operations in order to listen to the message.

Further, the processing circuitry 300 may check whether the communication device 100 is connected to an external display such as television screen, a projection screen, or the like. In response to determining that the communication device 100 is connected to an external display, the processing circuitry 300 may delay displaying a video message that includes private contents.

Figure 5:
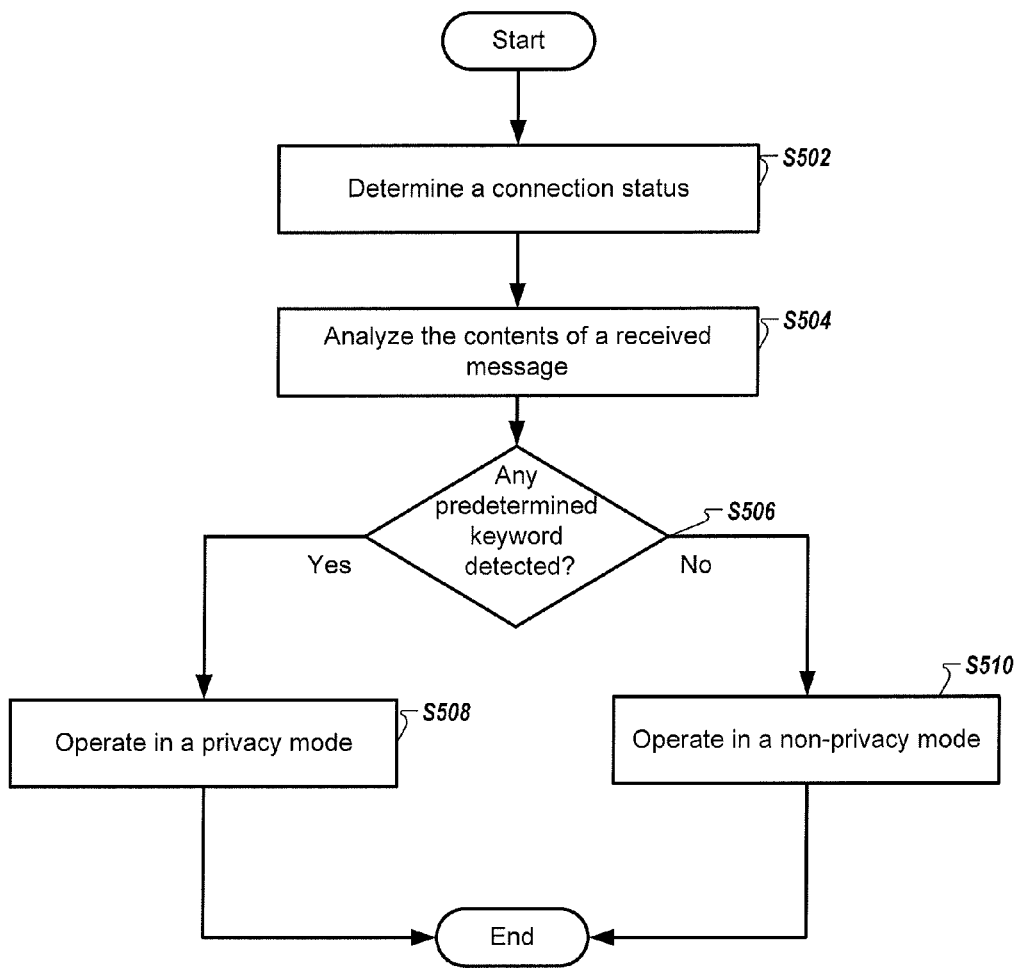
FIG. 5 is a flowchart for determining an operation mode according to one example.

FIG. 5 is a flowchart for determining an operation mode according to one example. At step S502, the processing circuitry 300 may determine a connection status of the communication device 100. The processing circuitry 300 may determine whether the communication device 100 is connected to an external device (e.g., headphones, external display), for example, via the audio port 320 or wirelessly (e.g., wireless headphones).

At step S504, the processing circuitry 300 may analyze the contents of a received message to determine whether any predetermined keywords is included in the contents of the received message. Additionally or alternatively, the processing circuitry 300 may check to see whether the received message is flagged as private.

At step S506, the processing circuitry 300 may determine whether any predetermined keywords are detected at step S504. In response to determining that at least one predetermined keyword is detected, the flow goes to step S508. In response to determining that the contents of the received message do not include any predetermined keywords, the flow goes to step S510. At step S508, the processing circuitry 300 operates in a privacy mode. For example, the processing circuitry 300 based on the connection status determined at step S502 may delay outputting the received message. In one example, when the connection status indicates that the communication device 100 is connected to an external display and the received message includes private content, the processing circuitry 300 may output the received message via the display 316 of the communication device 100 and not via the external display. The processing circuitry 300 may continue to operate in a privacy mode for subsequent received messages (e.g., during a message conservation) and/or for a predefined period (e.g., 15 minutes). At step S510, the processing circuitry 300 operates in a non-privacy mode. Thus, the processing circuitry 300 outputs the received message based on the connection status determined at step S502.

The aforementioned provide the advantage of content being automatically outputted, based on the particular type of content. For example, for privacy and security purposes, a user may not want the audio message delivered unless the earphones are plugged in.

Figure 6:
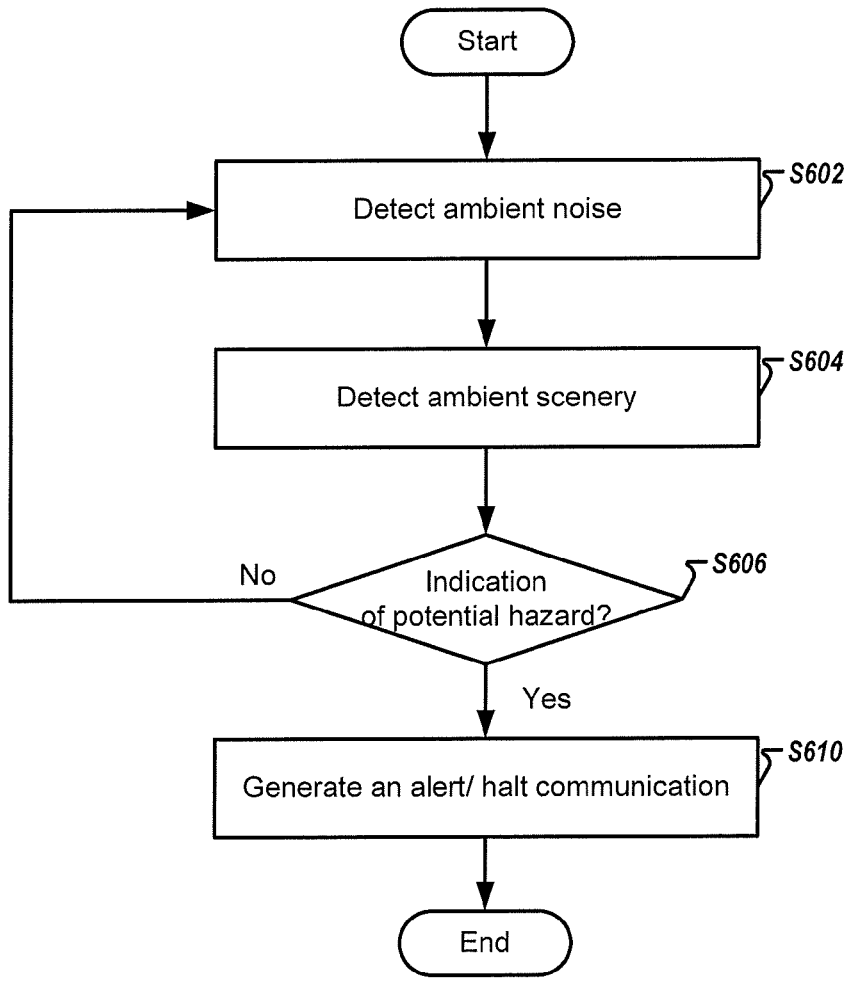
FIG. 6 is a flowchart that shows a method for monitoring the surroundings of a recipient according to one example.

FIG. 6 is a flowchart for monitoring the surroundings of a recipient according to one example. At step S602, ambient noise may be detected by the communication device 100. For example, the server 104 may send a signal to the communication device 100 to start monitoring the surroundings of the communication device 100. The communication device 100 may record the ambient noise via the microphone 312. The processing circuitry 300 may determine noise parameters based on the recorded ambient noise. The noise parameters may include a highest, a lowest, and an average detected power, a sound frequency range, a sound pressure level, duration, pitch, and other sound features as would be understood by one of ordinary skill in the art.

At step S604, the communication device 100 may detect a video stream and/or one or more photos of the surroundings via the one or more cameras 314. For example, the communication device 100 may detect a video sequence of the surroundings via the front and rear cameras. The processing circuitry 300 may extract image and/or video features from the video sequences. The image and video features may include statistical features (e.g., scene changes, motion flow). The processing circuitry 300 may determine a difference measure between images to measure similarity. For example, the processing circuitry 300 determines a measure for similarity of the preselected objects stored in the hazards database 106 and detected objects. The extracted noise parameters and image/video features may be stored in the memory 308 of the communication device 100.

At step S606, the communication device 100 may determine whether the surroundings include a potential hazard to the user. For example, the communication device 100 may identify objects in the video sequence using object recognition techniques such as appearance based methods (e.g., edge matching, divide-and-conquer search, greyscale matching), feature-based methods (e.g., interpretation trees, hypothesize and test), genetic algorithms, and the like. The communication device 100 may use a look-up table to compare the detected objects with the preselected objects (e.g., sound of a speeding vehicle, street intersection, beeping) associated with hazards. The look-up table may be stored in the hazard database 106. In one example, the processing circuitry 300 may compare the extracted image and video features at S604 with image and video features associated with the preselected objects. The communication device 100 may identify sounds using artificial neural networks, learning vector quantization, and dynamic time warping classification techniques. Then, the communication device 100 may compare the identified sound with preselected sounds associated with hazards stored in the hazards database 106. In response to determining that there is an indication of a potential hazard (e.g., a match with a preselected object or sound), the flow goes to step S610. In response to determining that there is no indication of potential hazard, the flow goes back to step S602.

At step S610, the communication device 100 may halt the delivery of a communication message when a message is being delivered. For example, when the hazard is a street intersection, the communication device 100 may pause the message delivery until the user has finished crossing the street. The processing circuitry 300 may determine that the user has stopped moving based on movement detection via an accelerometer included in the communication device 100. Then, the processing circuitry 300 may detect and analyze a new video stream to determine whether the user has finished crossing the street. Alternatively, the processing circuitry 300 may deliver the communication message after a predetermined period has elapsed (e.g., one minute when the hazard is a street intersection).

Further, the monitoring of the surroundings may be based on the type of the difficulties of the user. In other words, steps S602 or S604 may be omitted from the above-discussed process.

In one aspect, the communication device 100 may analyze objects and scenery detected by the one or more cameras 314. For example, the communication device 100 may identify that a walk sign is on in the intersection. Then, the communication device 100 may halt an audio message being delivered to a user with visual difficulties such as the user may hear that the sign walk is on. Once the communication device 100 determines that the user has crossed the street, the delivery of the audio message is resumed.

Further, the communication device 100 may generate an alert to the user. For example, the communication device 100 may activate a tactile alarm when a potential hazard is identified. The alert type may be based on the identity of the user. For example, if the user has visual difficulties, the alert type may be a tactile alarm or a sound alarm. In addition, the frequency and/or the intensity of the alert may be based on the forthcoming hazards (e.g., nearness of a passing vehicle). Further, the communication device 100 may automatically shut down once a potential hazard is identified.

In one aspect, the communication device 100 may send a signal to the server 104 indicating a potential hazard to the user. In turn, the server 104 may delay sending the message to the communication device 100.

In one aspect, the communication device 100 may transmit information including the noise recording and/or the video sequence of the surroundings to the server 104. Then, the server 104 may analyze the information to determine whether a potential hazard exists. In turn, the server 104 may delay the delivery of a message to the user when a potential hazard exists.

Potential hazards are user specific. For example, if the communication device 100 detects a vehicle in the view of the user, and the user has a visual impairment, the vehicle is categorized as a potential hazard. A vehicle in the field of view of a user with hearing difficulties is not identified as a potential hazard. Further, the sound of a speeding vehicle is classified as a potential hazard for a user with hearing difficulties.

In one aspect, the server 104 may check whether the user is moving before monitoring the surroundings. Thus, when the user is stationary the monitoring may not be performed to minimize power consumption from the one or more cameras and the microphone. For example, the server 104 may check whether there is a change in the location of the communication device 100. The location of the communication device 100 may be determined based on any localization techniques described herein or other localization techniques. The server 104 may also send a request to the communication device 100 to determine whether the user is moving. The communication device 100 may detect movement using an accelerometer included in the communication device 100 as would be understood by one of ordinary skill in the art.

In one aspect, when the user is a predefined location the monitoring is not performed. Predefined locations may include the user's home and work location. Thus, when the user is at a predefined location the message may be automatically delivered. The predefined locations may be stored in the user information database 110. The user or a caregiver may set the predefined locations. Further, the predefined locations may include locations that the user frequent on a regular basis. For example, the processing circuitry 300 may store a log for geographical locations visited by the user. Then, the processing circuitry 300 may analyze the log to identify locations that the user visits frequently (e.g., visit more than a predetermined threshold in a predefined period). The identified locations are stored in the user information database 110 as predefined locations where the monitoring of the surroundings is not performed.

As described previously herein, the communication device 100 may monitor the surroundings while delivering a communication message (e.g., a sign language sequence). In addition, the server 104 may monitor the surroundings before delivering a communication message.

FIG. 7 is a flowchart illustrating a method of communication according to one example. At step S702, the user may activate an icon on a graphical user interface (e.g., interface 1000 shown in FIG. 10 to start recording a message. Then, the server 104 receives the message from the communication device 100 via the network 102. The communication message may be in the form of text, sign language, audio, and the like.

At step S704, the server 104 may identify the one or more recipients of the message. The server 104 may extract recipient data from the received message. The one or more recipients may be identified by a name, a phone number, an email address, or the like.

At step S706, the server 104 may check to see whether any of the one or more recipients request the message in a different communication medium than the original communication medium of the message. The server 104 may check the user information database 110 to determine an association between a user and the communication medium. In response to determining that at least one recipient requires the message in an alternate communication medium, the process goes to step S708. In response to determining that the original communication medium is acceptable to the one or more recipients, the process goes to step S710.

At step S708, the server 104 may transform the message to the one or more alternate communication mediums determined at step S706. For example, the server 104 may transform the message from an audio input to a sign language sequence. The server 104 may also transform the message from a text in a first language to a text in a second language (e.g., Arabic to English, French to Arabic, etc.). The language may be determined from the user information database 110. In one aspect, the language may be associated with the user geographic location. The geographic location of the user may be determined based on any localization techniques described herein or any other localization methods as would be understood by one of ordinary skill in the art.

The server 104 may transform the message using a plurality of techniques and translators. For example, speech to text translator can be Dragon System's NATURALLY SPEAKING or IBM's VIA VOICE. A text-to-speech translator may be MICROSOFT's text-to-speech engine. A text-to-sign translator may access video movies of signed words and letters that are stored in the sign language database 108. As described previously herein, the sign language database 108 may store thousands of short (e.g., 2 seconds) video clips, each of which shows a person singing a particular word. The text-to-sign translator may compare each word of text to those stored in the sign language database 108. The speech-to-sign translator may transform the speech to text via the speech-to-text translator, then may transform the text to sign via the text-to-sign translator.

In one aspect, the server 104 may generate a notification to the user indicating that the message is incomplete when the server 104 fails to transform at least one part of the message (e.g., one word). In one example, if a word is not found in the sign language database 108, the text-to-sign translator breaks the word down into individual letters and plays video clips that show a person finger spelling each letter in the word.

At step S710, the message is delivered in the communication medium associated with each of the recipients.

Figure 8:
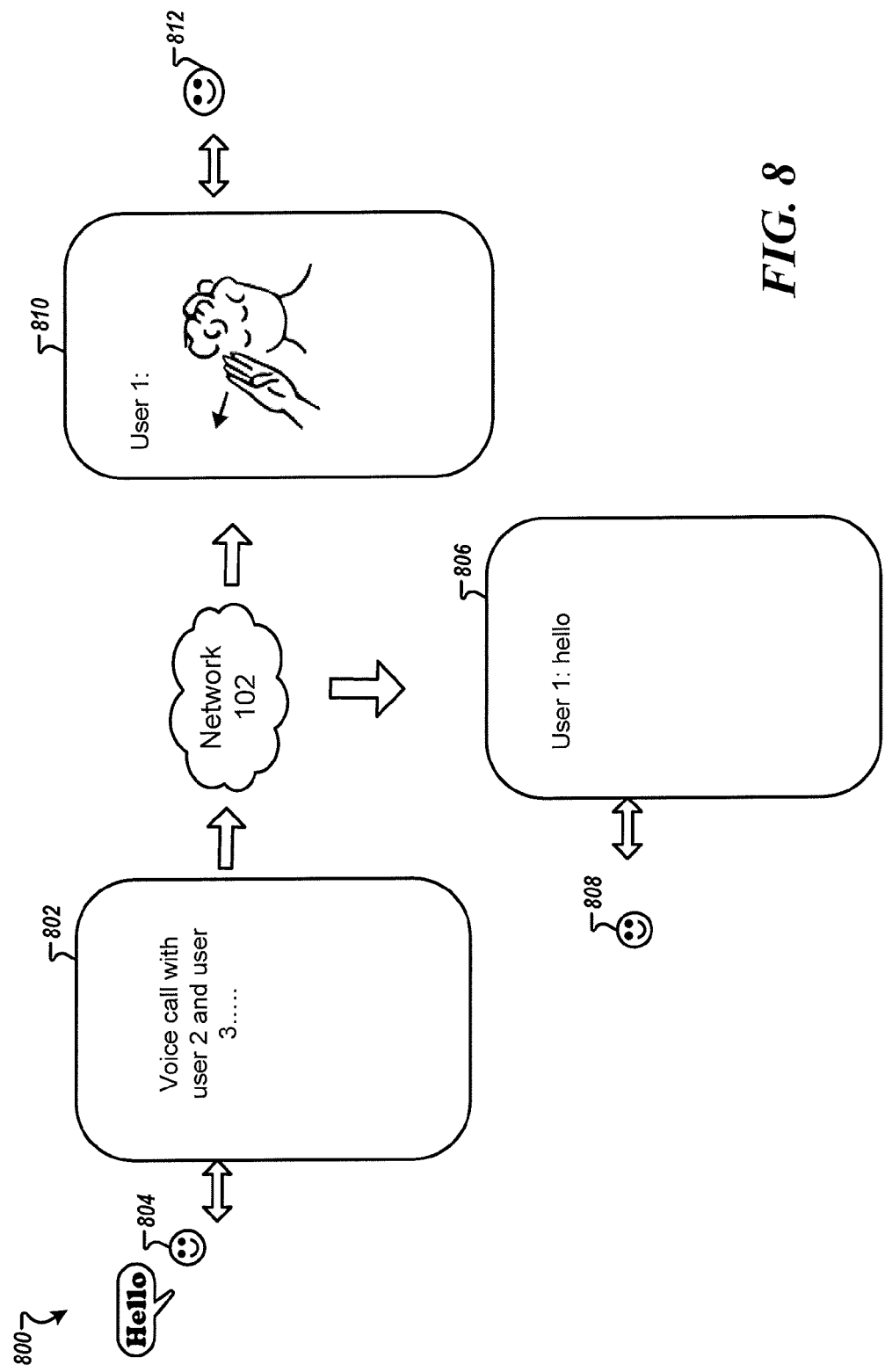
FIG. 8 is a schematic that shows a group conversation between a plurality of users according to one example.

FIG. 8 is a schematic diagram that shows a group communication between a plurality of users according to one example. Schematic 800 shows group communication between a plurality of communication devices. A first device 802 is associated with a first user 804. A second device 806 is associated with a second user 808. A third device 810 is associated with a third user 812. In one illustrative example, the first user 804 may input via a microphone of the first device 804, the word "Hello". The message recipients are the second user 808 and the third user 812. Upon receiving the message "Hello" from the first user 804 via the network 102, the server 104 may check a look-up table stored in the user information database 110 to determine a language/communication medium associated with each of the message recipient. The look-up table may be organized by user name or a phone number associated with each of the communication devices 802, 806, 810. The second user 808 may have hearing difficulties but does not understand sign language. Thus, the second user 808 may select to receive the message in a text form. The server 104 delivers the message "hello" in a text form to the second user. The third user 812 may also have hearing difficulties. The preferred communication medium of messaging for the third user 812 may be sign language. Thus, the server 104 transforms the message "Hello" to sign language and outputs the video to the third user 812.

Figure 9:
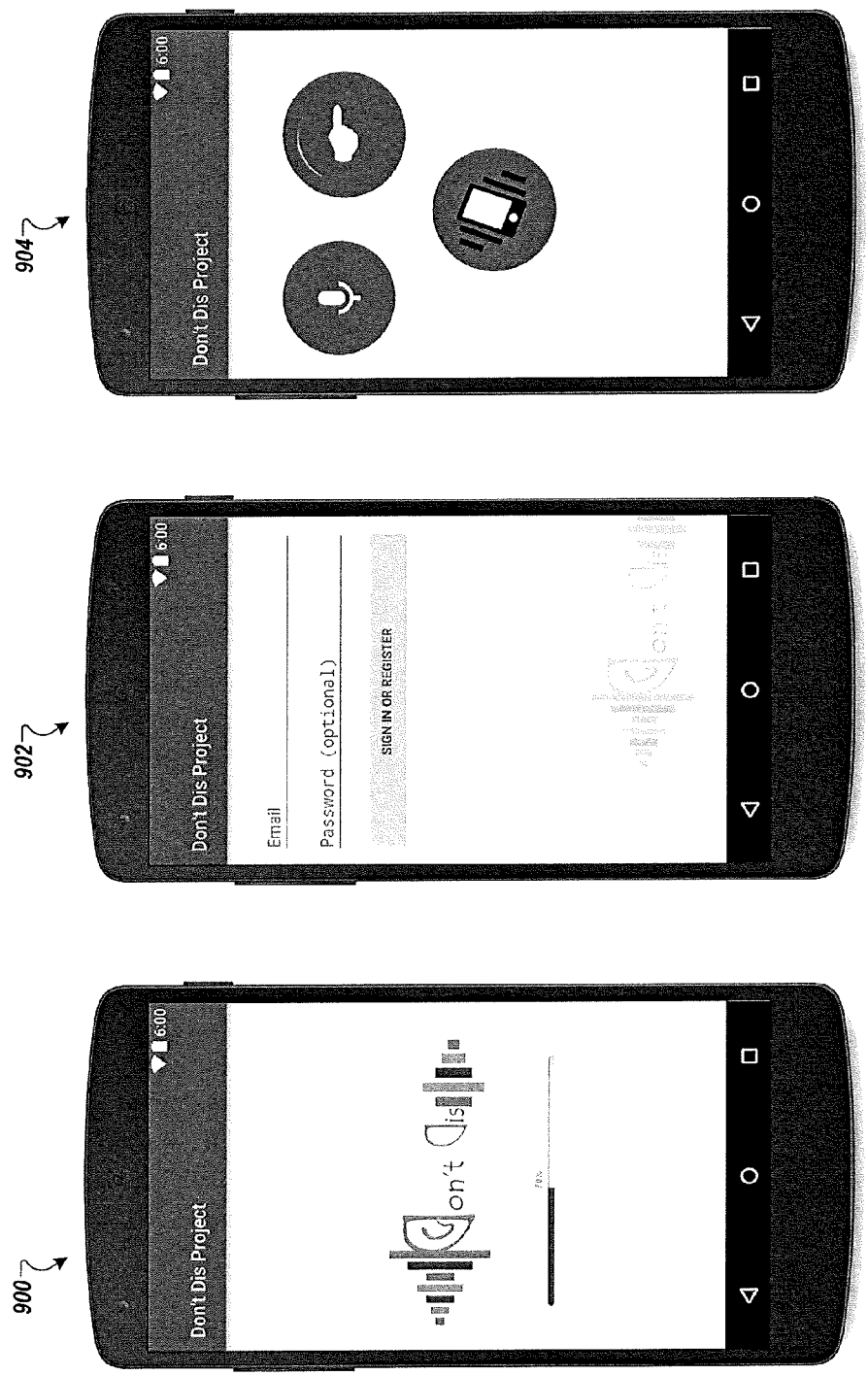
FIG. 9 is a schematic that shows exemplary user interfaces of the communication device.

FIG. 9 is a schematic that shows exemplary user interfaces of the communication device 100. The user interface is part of a website, web portal, personal computer application, or mobile device application configured to allow the user to interact with the server 104. For example, the user may download the application from the server 104 as shown in schematic 900.

User interface 902 includes a "Login" pane that presents the user with a field to input a username (e.g., email address, phone number) and a password. User interface 904 includes a "selection" pane that presents the user with three navigational controls for accessing different modes of the system (e.g., monitoring, sign, input voice recording).

Figure 10:
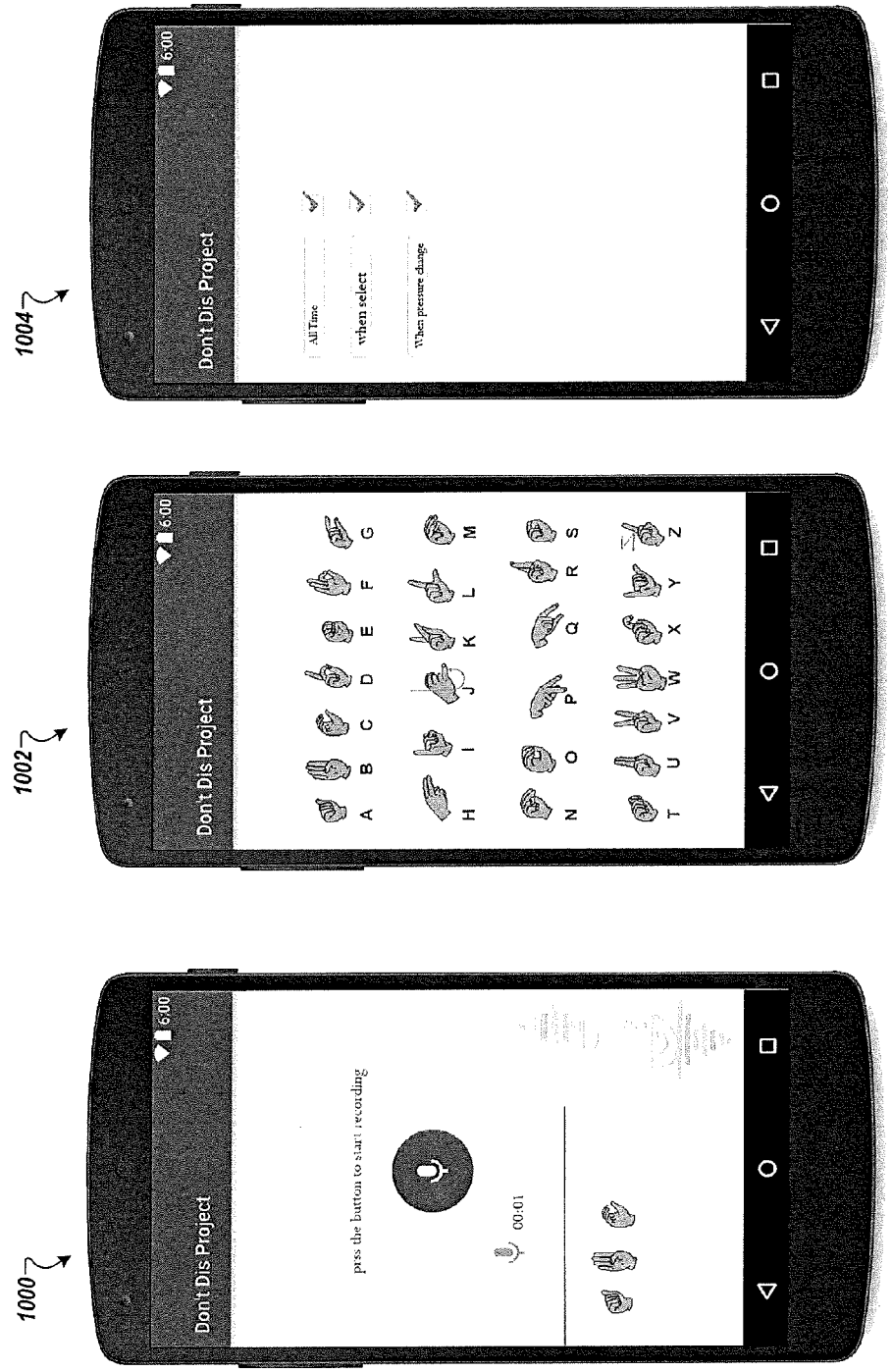
FIG. 10 is a schematic that shows exemplary user interfaces of the communication device.

FIG. 10 is a schematic that shows exemplary user interfaces of the communication device 100. User interface 1000 includes a "record button". Upon activation of the "record button", for example, the communication device 100 may start recording an audio input and automatically output a sign language sequence that may be shown on the sender's communication device and the recipient's communication device. Schematic 1002 shows a sample display screen for communication device 100. Schematic 1002 shows letters of the alphabet with the associated sign language animation. Upon clicking on one of the letters, the animation may be shown to the user. This may help the user to learn the sign language. User interface 1004 presents the user with a plurality of settings for hazards detection.

Next, a hardware description of the server 104 according to exemplary embodiments is described with reference to FIG. 11. In FIG. 11, the server 104 includes a CPU 1100 which performs the processes described herein. The process data and instructions may be stored in memory 1102. These processes and instructions may also be stored on a storage medium disk 1104 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the server 104 communicates, such as the communication device 100.

Further, the claimed advancements may be provided as a utility application, background daemon, or component of an operating system, or combination thereof, executing in conjunction with CPU 1100 and an operating system such as Microsoft Windows 7, UNIX, Solaris, LINUX, Apple MAC-OS and other systems known to those skilled in the art.

In order to achieve the server 104, the hardware elements may be realized by various circuitry elements, known to those skilled in the art. For example, CPU 1100 may be a Xenon or Core processor from Intel of America or an Opteron processor from AMD of America, or may be other processor types that would be recognized by one of ordinary skill in the art. Alternatively, the CPU 1100 may be implemented on an FPGA, ASIC, PLD or using discrete logic circuits, as one of ordinary skill in the art would recognize. Further, CPU 1100 may be implemented as multiple processors cooperatively working in parallel to perform the instructions of the inventive processes described above.

The server 104 in FIG. 11 also includes a network controller 1106, such as an Intel Ethernet PRO network interface card from Intel Corporation of America, for interfacing with network 102. As can be appreciated, the network 102 can be a public network, such as the Internet, or a private network such as LAN or WAN network, or any combination thereof and can also include PSTN or ISDN sub-networks. The network 102 can also be wired, such as an Ethernet network, or can be wireless such as a cellular network including EDGE, 3G and 4G wireless cellular systems. The wireless network can also be WiFi, Bluetooth, or any other wireless form of communication that is known.

The server 104 further includes a display controller 1108, such as a NVIDIA GeForce GTX or Quadro graphics adaptor from NVIDIA Corporation of America for interfacing with display 1110, such as a Hewlett Packard HPL2445w LCD monitor. A general purpose I/O interface 1112 interfaces with a keyboard and/or mouse 1114 as well as an optional touch screen panel 1116 on or separate from display 1110. General purpose I/O interface also connects to a variety of peripherals 1118 including printers and scanners, such as an OfficeJet or DeskJet from Hewlett Packard.

A sound controller 1120 is also provided in the server 104, such as Sound Blaster X-Fi Titanium from Creative, to interface with speakers/microphone 1122 thereby providing sounds and/or music.

The general purpose storage controller 1124 connects the storage medium disk 1104 with communication bus 1126, which may be an ISA, EISA, VESA, PCI, or similar, for interconnecting all of the components of the server 104. A description of the general features and functionality of the display 1110, keyboard and/or mouse 1114, as well as the display controller 1108, storage controller 1124, network controller 1106, sound controller 1120, and general purpose I/O interface 1112 is omitted herein for brevity as these features are known.

A system, which includes the features in the foregoing description, provides numerous advantages to users. In particular, the system provides assisted communications to users having visual, hearing, or speech difficulties. In addition, the system and associated methodologies improve the safety of the users by monitoring, in real time, the surroundings before and during message delivery. Further, the system provides the advantage of protecting the privacy of the users when outputting communication messages. The system automatically identifies private messages by analyzing the contents of messages to detect predetermined keywords and learned keywords from previous messages, and based on a connection status to external interfaces. Thus, the system and associated methodology provide as significant improvement to the technology by enabling faster, private, and safer communication with individuals having any degree of visual, hearing, or speech difficulties.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The above disclosure also encompasses the embodiments listed below.

(1) A method for assisting communications, the method including: receiving a message in a first communication medium from a first device of a first user, the message having one or more recipients; determining, using processing circuitry, whether at least one recipient of the one or more recipients is in a predefined category by referencing a stored look-up table; monitoring, via one or more sensors that are conveyed by at least one recipient device, surroundings of the at least one recipient when the at least one recipient is in the predefined category; detecting, using the processing circuitry, whether there is a hazard based on the monitoring by analyzing data provided by the one or more sensors; determining, using the processing circuitry, whether the first communication medium corresponds to a preferable communication medium based on the predefined category of the at least one recipient; converting, using the processing circuitry, the message to the preferable communication medium when the first communication medium does not correspond to the preferable communication medium; and delivering the converted message to the at least one recipient device when a hazard is not detected.

(2) The method of feature (1), in which the message includes at least one of an image message, a video message, a sign message, a text message, an audio message, and a Braille message.

(3) The method of feature (1) or (2), in which the predefined category includes visual difficulties, speech difficulties, and hearing difficulties.

(4) The method of any of features (1) to (3), in which monitoring the surroundings of the at least one recipient further includes: recording image data via one or more cameras, the image data representing the surroundings of the at least one recipient; detecting preselected objects from the image data, the preselected objects representing hazards identified as a function of the predefined category; detecting acoustic noise via a microphone; and recognizing preselected noises from the detected acoustic noise, the preselected noises representing hazards identified as a function of the predefined category.

(5) The method of any of features (1) to (4), further including delaying the delivery of the message based on the message communication medium as a function of a detected hazard.

(6) The method of feature (5), further including sending a notification to the first device of the first user when the message delivery is delayed.

(7) The method of any of features (1) to (6), further including analyzing the content of the message to detect predetermined keywords, the predetermined keywords being predefined keywords stored in the memory that indicate that the message is private; and delaying the delivery of the message when at least one predetermined keywords is detected.

(8) The method of feature (7), in which the predetermined keywords further include keywords extracted from the contents of messages previously received by the at least one recipient.

(9) The method of any of features (1) to (8), further including: detecting a connection status to an external device; determining whether the message is private based on the contents of the message; and modifying a delivery time of the message based on the connection status when the message is private.

(10) The method of feature (9), further including delaying the delivery of the message when the message is a video message and the external device is an external display.

(11) The method of feature (9), further including outputting the message when the message is an audio message and the external device is earphones.

(12) The method of any of features (1) to (11), further including transmitting a signal to the at least one recipient device when a hazard is detected, the signal causing the at least one recipient device to activate an alarm, wherein a type of the alarm is identified based on the predefined category.

(13) The method of any of features (1) to (12), further including determining a severity level of a detected hazard; and transmitting a signal to the at least one recipient device when the severity level is above a predetermined threshold, the signal causing the at least one recipient device to turn off.

(14) The method of feature (13), in which the severity level is determined based on a similarity value between the identified hazard and a preselected object or a preselected noise.

(15) The method of any of features (1) to (14), in which hazards are based on a geographical position of the at least one recipient device.

(16) The method of feature (15), in which a sound threshold associated with a hazard is based on an average noise level at the geographical location of the at least one recipient device.

(17) The method of feature (16), in which a sound threshold associated with a hazard is higher in an urban location than in a rural location.

(18) The method of any of features (1) to (17), in which a visual threshold associated with a hazard is based on received sensor values and learned trends in the received sensor values, the received sensor values corresponding to the amount of brightness in the surroundings of the at least one recipient.

(19) A system for assisting communications, the system comprising: a communication device including one or more sensors; and a server that includes processing circuitry configured to receive a message from a first device of a first user in a first communication medium, the message having one or more recipients, determine whether at least one recipient of the one or more recipients is in a predefined category by referencing a stored look-up table, monitor, via the one or more sensors that are conveyed by at least one recipient device, surroundings of the at least one recipient when the at least one recipient is in the predefined category, detect whether there is a hazard based on the monitoring by analyzing data provided by the one or more sensors, determine whether the first communication medium corresponds to a preferable communication medium based on the predefined category of the at least one recipient, convert the message to the preferable communication medium when the first communication medium does not correspond to the preferable communication medium, and deliver the converted message to the at least one recipient device when a hazard is not detected.

(20) The system of feature (19), in which the message includes at least one of an image message, a video message, a sign message, a text message, an audio message, and a Braille message.

(21) The system of feature (19) or (20), in which the predefined category includes visual difficulties, speech difficulties, and hearing difficulties.

(22) The system of any of features (19) to (21), in which the processing circuitry is further configured to record image data via one or more cameras, the image data representing the surroundings of the at least one recipient; detect preselected objects from the image data, the preselected objects representing hazards identified as a function of the predefined category; detect acoustic noise via a microphone; and recognize preselected noises from the detected acoustic noise, the preselected noises representing hazards identified as a function of the predefined category.

(23) The system of any of features (19) to (22), in which the processing circuitry is further configured to delay the delivery of the message based on the message communication medium as a function of a detected hazard.

(24) The system of feature (23), in which the processing circuitry is further configured to send a notification to the first device of the first user when the message delivery is delayed.

(25) The system of any of features (19) to (24), in which the processing circuitry is further configured to analyze the content of the message to detect predetermined keywords, the predetermined keywords being predefined keywords stored in the memory that indicate that the message is private; and delay the delivery of the message when at least one predetermined keywords is detected.

(26) The system of feature (25), in which the predetermined keywords further include keywords extracted from the contents of messages previously received by the at least one recipient.

(27) The system of any of features (19) to (26), in which the processing circuitry is further configured to detect a connection status to an external device; determine whether the message is private based on the contents of the message; and modify a delivery time of the message based on the connection status when the message is private.

(28) The system of feature (27), in which the processing circuitry is further configured to delay the delivery of the message when the message is a video message and the external device is an external display.

(29) The system of feature (27), in which the processing circuitry is further configured to output the message when the message is an audio message and the external device is earphones.

(30) The system of any of features (19) to (29), in which the processing circuitry is further configured to transmit a signal to the at least one recipient device when a hazard is detected, the signal causing the at least one recipient device to activate an alarm, wherein a type of the alarm is identified based on the predefined category.

(31) The system of any of features (19) to (30), in which the processing circuitry is further configured to determine a severity level of a detected hazard; and transmit a signal to the at least one recipient device when the severity level is above a predetermined threshold, the signal causing the at least one recipient device to turn off.

(32) The system of feature (31), in which the severity level is determined based on a similarity value between the identified hazard and a preselected object or a preselected noise.

(33) The system of any of features (19) to (32), in which hazards are based on a geographical position of the at least one recipient device.

(34) The system of feature (33), in which a sound threshold associated with a hazard is based on an average noise level at the geographical location of the at least one recipient device.

(35) The system of feature (34), in which a sound threshold associated with a hazard is higher in an urban location than in a rural location.

(36) The system of any of features (19) to (35), in which a visual threshold associated with a hazard is based on received sensor values and learned trends in the received sensor values, the received sensor values corresponding to the amount of brightness in the surroundings of the at least one recipient.

(34) A non-transitory computer readable medium storing instructions, which when executed by at least one processor cause the at least one processor to perform the method of any of features (1) to (18).

The invention claimed is:

1. A method for assisting communications, the method comprising:
receiving a message in a first communication medium from a first device of a first user, the message having one or more recipients, wherein a communication medium includes an image message, a video message, a sign message, a text message, an audio message, and a Braille message;
determining, using processing circuitry, whether at least one recipient of the one or more recipients is in a predefined category by referencing a stored look-up table, predefined categories including individuals having visual difficulties, individuals having speech difficulties, and individuals having hearing difficulties;
determining a location of the at least one recipient when the at least one recipient belongs to the predefined category;
monitoring, via one or more sensors that are conveyed by at least one recipient device, surroundings of the at least one recipient when the at least one recipient is in the predefined category and when the location of the at least one recipient does not correspond to a predefined location;
detecting, using the processing circuitry, whether there is a hazard based on the monitoring by analyzing data provided by the one or more sensors;
determining, using the processing circuitry, whether the first communication medium corresponds to a preferable communication medium based on the predefined category of the at least one recipient;
converting, using the processing circuitry, the message to the preferable communication medium when the first communication medium does not correspond to the preferable communication medium; and
delivering the converted message to the at least one recipient device when a hazard is not detected.

2. The method of claim 1, wherein monitoring the surroundings of the at least one recipient further includes:
recording image data via one or more cameras, the image data representing the surroundings of the at least one recipient;
detecting preselected objects from the image data, the preselected objects representing hazards identified as a function of the predefined category;
detecting acoustic noise via a microphone; and
recognizing preselected noises from the detected acoustic noise, the preselected noises representing hazards identified as a function of the predefined category.

3. The method of claim 1, further comprising:
delaying the delivery of the message based on the message communication medium as a function of a detected hazard.

4. The method of claim 3, further comprising:
sending a notification to the first device of the first user when the message delivery is delayed.

5. The method of claim 1, further comprising:
analyzing the content of the message to detect predetermined keywords, the predetermined keywords being predefined keywords stored in the memory that indicate that the message is private; and
delaying the delivery of the message when at least one predetermined keywords is detected.

6. The method of claim 5, wherein the predetermined keywords further include keywords extracted from the contents of messages previously received by the at least one recipient.

7. The method of claim 1, further comprising:
detecting a connection status to an external device;
determining whether the message is private based on the contents of the message; and
modifying a delivery time of the message based on the connection status when the message is private.

8. The method of claim 7, further comprising:
delaying the delivery of the message when the message is a video message and the external device is an external display.

9. The method of claim 7, further comprising:
outputting the message when the message is an audio message and the external device is earphones.

10. The method of claim 1, further comprising:
transmitting a signal to the at least one recipient device when a hazard is detected, the signal causing the at least one recipient device to activate an alarm, wherein a type of the alarm is identified based on the predefined category.

11. The method of claim 1, further comprising:
determining a severity level of a detected hazard; and
transmitting a signal to the at least one recipient device when the severity level is above a predetermined threshold, the signal causing the at least one recipient device to turn off.

12. The method of claim 11, wherein the severity level is determined based on a similarity value between the identified hazard and a preselected object or a preselected noise.

13. The method of claim 1, wherein hazards are based on a geographical position of the at least one recipient device.

14. The method of claim 13, wherein a sound threshold associated with a hazard is based on an average noise level at the geographical location of the at least one recipient device.

15. The method of claim 14, wherein a sound threshold associated with a hazard is higher in an urban location than in a rural location.

16. The method of claim 13, wherein a visual threshold associated with a hazard is based on received sensor values and learned trends in the received sensor values, the received sensor values corresponding to the amount of brightness in the surroundings of the at least one recipient.

17. The method of claim 1, further comprising:
generating an alert to the at least one recipient when the predefined category of the at least one recipient is individuals having speech difficulties and when an amount of brightness detected by the at least one recipient device is below a predetermined threshold value that indicates that the at least one recipient is not able to communicate via sign language.

18. The method of claim 1, further comprising:
transforming the message from an audio message to a sign message when the at least one recipient belongs to individuals having hearing difficulties.

19. A system for assisting communications, the system comprising:
a communication device including one or more sensors; and
a server that includes processing circuitry configured to
receive a message from a first device of a first user in a first communication medium, the message having one or more recipients, wherein a communication medium includes an image message, a video message, a sign message, a text message, an audio message, and a Braille message, determine whether at least one recipient of the one or more recipients is in a predefined category by referencing a stored look-up table, predefined categories including individuals having visual difficulties, individuals having speech difficulties, and individuals having hearing difficulties, determining a location of the at least one recipient when the at least one recipient belongs to the predefined category, monitor, via the one or more sensors that are conveyed by at least one recipient device, surroundings of the at least one recipient when the at least one recipient is in the predefined category, and when the location of the at least one recipient does not correspond to a predefined location, detect whether there is a hazard based on the monitoring by analyzing data provided by the one or more sensors, determine whether the first communication medium corresponds to a preferable communication medium based on the predefined category of the at least one recipient, convert the message to the preferable communication medium when the first communication medium does not correspond to the preferable communication medium, and deliver the converted message to the at least one recipient device when a hazard is not detected.

20. A non-transitory computer readable medium storing computer-readable instructions therein which when executed by a computer cause the computer to perform a method for assisting communications, the method comprising:

receiving a message in a first communication medium from a first device of a first user, the message having one or more recipients, wherein a communication medium includes an image message, a video message, a sign message, a text message, an audio message, and a Braille message;

determining whether at least one recipient of the one or more recipients is in a predefined category by referencing a stored look-up table, predefined categories including individuals having visual difficulties, individuals having speech difficulties, and individuals having hearing difficulties;

determining a location of the at least one recipient when the at least one recipient belongs to the predefined category;

monitoring, via one or more sensors that are conveyed by the at least one recipient device, surroundings of the at least one recipient when the at least one recipient is in the predefined category and when the location of the at least one recipient does not correspond to a predefined location;

detecting whether there is a hazard based on the monitoring by analyzing data provided by the one or more sensors;

determining whether the first communication medium corresponds to a preferable communication medium associated with the at least one recipient based on the predefined category of the at least one recipient;

converting the message to the preferable communication medium when the first communication medium does not correspond to the preferable communication medium; and delivering the converted message to the at least one recipient device when a hazard is not detected.

* * * * *